Oct. 4, 1949.   W. PAULS   2,483,930
FRUIT PEELING DEVICE
Filed Dec. 18, 1945
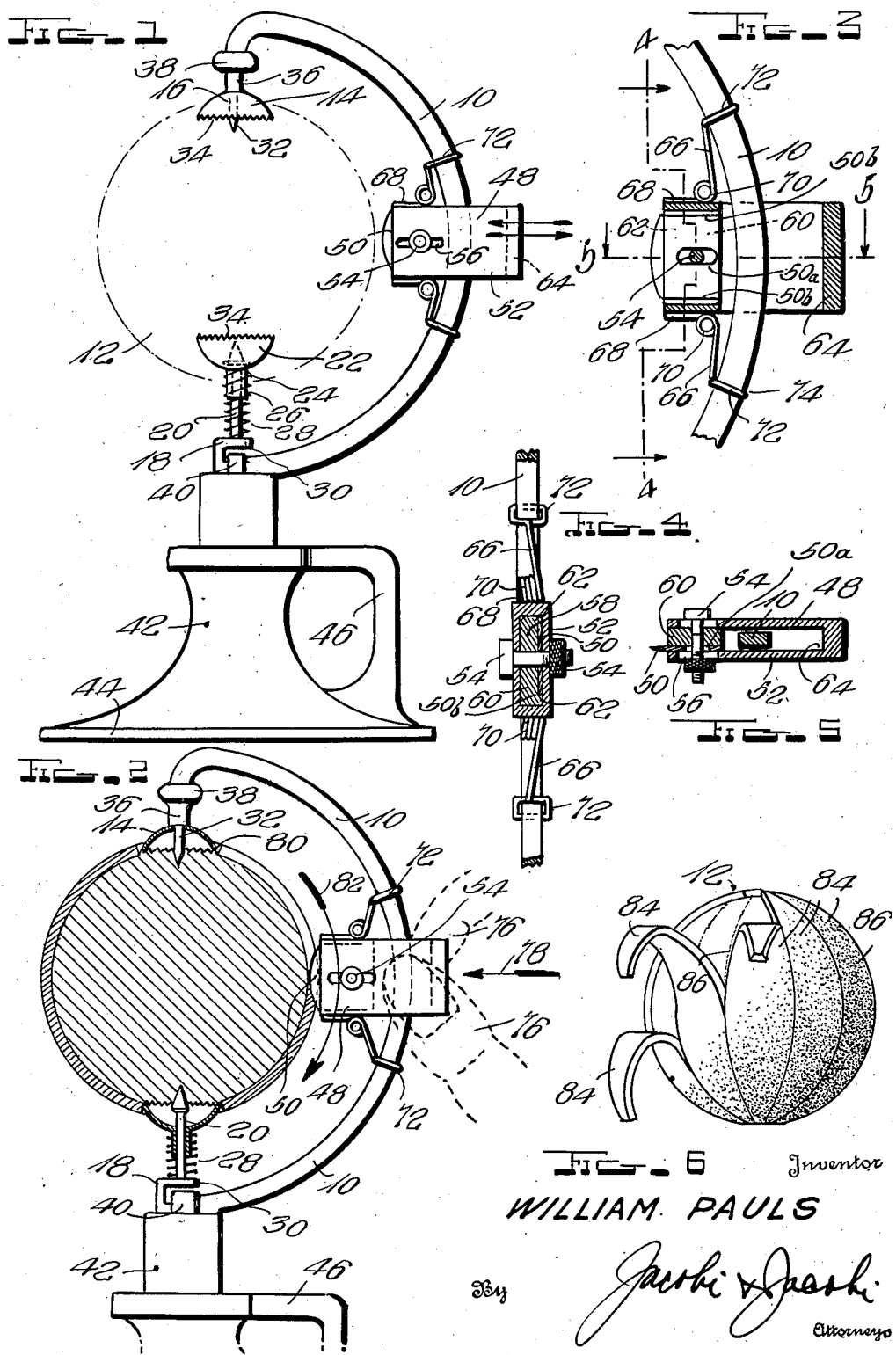
Inventor
WILLIAM PAULS
By
Attorneys Patented Oct. 4, 1949

2,483,930

UNITED STATES PATENT OFFICE 2,483,930

FRUIT PEELING DEVICE

William Pauls, Washington, D. C.

Application December 18, 1945, Serial No. 635,715

2 Claims. (Cl. 146—3)

This invention relates to fruit peeling and more particularly to a device for cutting fruit peels prior to peeling.

One object of the invention is to provide a peel cutting device which will cut a fruit peel into sections of a size and shape for quick peeling and having straight edges so that the tendency of a peel section to break off while peeling is minimized.

Another object of the invention is to provide a peel cutting device which will cut a fruit peel in a manner whereby the inner edible parts remain uninjured and retain a pleasing experience.

Still another object of the invention is to provide a device of this character of such design that the depth of cut made in a fruit peel may be predetermined and adjusted for any particular peel thickness.

A still further object of the invention is to provide a device of this character into which the fruit may be easily inserted because of the normally retracted position of the cutter.

Still another object of the invention resides in the provision of toothed members, at least one of which is urged toward the surface of the fruit by a resilient means.

Still another object of the invention resides in the provision of a device which is simple in construction, comparatively inexpensive to manufacture and one which will be very efficient in operation.

Other and still further objects and advantages of the invention will become apparent from the following description of a preferred embodiment of the invention with reference to the accompanying drawings in which:

Figure 1 is a side elevation of the peel cutter of my invention;

Figure 2 is a similar view of my invention with parts thereof in cross section;

Figure 3 is a detailed view, partly in section, showing the cutting blade, the cutting blade handle, and an arcuate cutter guiding portion of the fruit holding structure of the invention;

Figure 4 is a view in section taken along the line 4—4 of Figure 3;

Figure 5 is a view of a typical section of the cutter handle of the invention; and Figure 6 is a side elevation of a piece of fruit which has been cut by the device, some sections of which have been partly peeled.

In describing the invention, I shall refer to the accompanying drawing in which similar reference characters designate corresponding parts throughout the several views.

The invention comprises a means for holding a piece of fruit in a position for cutting which includes an arcuate shaped member 10 of a shape so as to be spaced from and extending around a piece of fruit 12. The holding means further comprises toothed members 14 attached to the arcuate member 10 rigidly at one end as shown at 16 and preferably slidably attached to the arcuate member 10 at the lower end 18 by means of the pin 20.

The lower cup shaped toothed member 22 is provided with an opening 24 in the lower end thereof above which is attached a hollow shank portion 26 having an opening therethrough of a size for receiving the supporting pin 20 therethrough. A coiled spring 28, or other resilient means, is positioned between said movable toothed cup shaped member 22 and the end portion 30 of the arcuate shaped member 10 for urging the lower toothed member 22 against the surface of the piece of fruit 12.

The upper toothed cup shaped member is provided with a similar supporting pin 32 extending through the center thereof for engaging the piece of fruit 12. The cup shaped members 14 and 22 are each provided with teeth 34 on the inward surfaces thereof of any desired number and size. The arcuate shaped member 10 is provided at its upper end 36 with an enlarged portion 38 for further stopping soft fruit which has extended beyond the upper toothed member 14 from working farther up along the arcuate shaped member 10.

The arcuate shaped member 10 may be secured by means of a U-bolt 40 to a standard 42. The standard 42 may be of the type for resting on the top of a desk or of a clamping type for extending around the edge of a table.

When a standard of the type shown is used, its base 44 should be broad to provide stability and the carrying handle 46 may be provided. If desired the base 44 may be perforated for receiving therethrough screws or the like.

The cutting member 48 of this invention includes a cutting blade 50 held in place in a handle 52 by means of a said screw 54 which is positioned in an elongated slot 56 in the handle 52. A washer 58 may be provided and of a size for insertion in the passage 60 of the handle 52. The washer 60 is provided with ears 62 on either side thereof for surrounding on three sides the cutter blade 50.

The handle 52 is further provided with a slot 64 therein of a width for receiving therethrough the arcuate shaped member 10. The slot 64 is preferably of a length sufficient to allow the cutting blade 50 to be pushed into engagement with the peel of the piece of fruit 12. The cutting member 48 is normally held in a position away from the surface of the fruit 12 by means of springs 66 welded to the handle 52 at 68 and having coils 70 therein. The opposite ends 72 of the springs 66 are provided with loops 74 therein for slidably receiving the arcuate shaped member 10 therethrough.

In operation, a piece of fruit 12 is inserted on to the supporting pin 20 and pushed downwardly against the action of the spring 18 sufficiently to allow the fruit 12 to be positioned beneath the upper cup shaped member 14. The fruit 12 is then released and is held in engagement on the pins 20 and 32 by the toothed cup shaped members 14 and 22 and the action of the spring 28. The fruit, preferably an orange, is then given a turn with the hand so that the teeth 34 of the cup members 14 and 22 will cut the skin of the orange at the top and bottom and cause two openings to be formed therein. This is the first step toward peeling.

When this first step has been accomplished, the operator may grasp the handle 48 with his fingers 76 (indicated in dotted lines) and by moving the member 48 in the direction of the arrow, the blade 50 will cut the skin of the orange from the top 80 thereof to the bottom. By turning the fruit, successive cuts may be made in the skin so as to form sections 84. When sufficient sections have been cut, the fruit may be removed from the device by pressing downwardly against the tension of the spring 28 to release the fruit from the upper cup member and following which release may be obtained from the lower cup member. Once the orange is removed from the device, the sections of the skin may be readily peeled.

I have provided in this improved device a means for governing the depth of the cut of the blade, according to the thickness of the skin of the orange. To this end, the blade 50 is provided with a horizontal slot 50a, as clearly shown in Figs. 3 and 5 of the drawing. As shown, the blade is adjusted in the device for a medium cut. If it is desired to create a deeper cut in the skin, then and in that event, the blade is adjusted on the screw or bolt 54 to project further outwardly from the block or washer 58. It will be noted that the blade 50 is positively held and guided on the block or washer 58 between the upper and lower ribs or shoulders 50b formed on said block or washer, as clearly shown in Figs. 3 and 4 of the drawing.

It is understood that the above description of a preferred embodiment of the invention is for illustrative purposes only and that some modifications may be made therein within the scope and spirit of the following claims.

Having thus described my invention, what I claim is:

1. A fruit peel cutting device comprising a base having a standard at its top, a vertically disposed arcuate bar having its lower end secured upon said standard and its upper end portion extending downwardly and carrying a depending pin, a downwardly extending cup surrounding said pin and having a toothed lower edge, a lower pin rising from the lower end of said arcuate bar in alignment with the first pin, a cup surrounding the lower pin and having a toothed upper edge, the lower cup being slidable vertically along the lower pin, a spring about the lower pin urging the lower cup upwardly, and a cutter carried by said arcuate bar and consisting of a horizontally disposed handle having side walls disposed at opposite sides of the bar, forward portions of the side walls being formed with horizontally extending slots, a block mounted between forward portions of the side walls and formed with an opening registering with the slots, a blade fitting between the block and one side wall and formed with a horizontal slot registering with the slot of the last mentioned side wall, said blade having its forward portion projecting from the handle and formed with a longitudinally curved cutting edge, a bolt passing through the slots of the side walls and the blade and the opening of the block and tightened, flanges along upper and lower ends of the block engaging upper and lower edges of the blade and preventing the blade from turning about the bolt, and springs formed of resilient wire and having coiled portions and arms extending from ends thereof, certain of the arms being secured to the handle and others being formed with loops fitting about the arcuate bar above and below the handle and mounting the cutter for sliding movement along the said bar.

2. A fruit peel cutting device comprising a support, a vertically arcuate bar rising from said support, members at upper and lower ends of said bar for engaging upper and lower portions of fruit and mounting the fruit for turning movement to adjusted positions, and a cutter carried by said bar and consisting of a handle disposed horizontally and having side walls disposed at opposite sides of the bar and formed forwardly of the bar with horizontal slots, a block between forward portions of the side walls, a blade between the block and one side wall having its forward portion projecting from the handle and sharpened, a bolt passing through the block and the blade and the slots and tightened to secure the blade in an adjusted position, and springs carried by the body in front of said bar and having portions projecting upwardly and downwardly from the body and formed with loops fitting about the bar and mounting the cutter for sliding movements vertically along the bar.

WILLIAM PAULS.

REFERENCES CITED

The following references are of record in the file of this patent:

UNITED STATES PATENTS

| Number | Name | Date |
|---|---|---|
| 1,451,342 | Mendez | Apr. 10, 1923 |
| 1,511,137 | Pichler | Oct. 7, 1924 |
| 2,320,061 | Baumgarten | May 25, 1943 |

FOREIGN PATENTS

| Number | Country | Date |
|---|---|---|
| 849,324 | France | Aug. 11, 1939 |
| 534,494 | Germany | Sept. 26, 1931 |
| 319,655 | Italy | July 17, 1934 |